United States Patent
McGilly et al.

(10) Patent No.: US 8,676,206 B2
(45) Date of Patent: Mar. 18, 2014

(54) HANDOVER LATENCY REDUCTION

(75) Inventors: Paul McGilly, Cambridge (GB); Andrew Mark Earnshaw, Kanata (CA); Mo-Han Fong, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 45 days.

(21) Appl. No.: 13/193,207

(22) Filed: Jul. 28, 2011

(65) Prior Publication Data

US 2012/0040674 A1    Feb. 16, 2012

Related U.S. Application Data

(60) Provisional application No. 61/373,775, filed on Aug. 13, 2010.

(51) Int. Cl.
*H04W 36/00* (2009.01)

(52) U.S. Cl.
USPC ......... 455/436; 370/331; 370/350; 455/552.1

(58) Field of Classification Search
USPC ........................... 455/436–444; 370/331, 350
See application file for complete search history.

(56) References Cited

U.S. PATENT DOCUMENTS

| | | | | |
|---|---|---|---|---|
| 6,556,838 | B1 * | 4/2003 | Baker et al. ................... | 455/522 |
| 2005/0043046 | A1 * | 2/2005 | Lee ............................... | 455/502 |
| 2009/0111468 | A1 | 4/2009 | Burgess et al. | |
| 2009/0191875 | A1 * | 7/2009 | Vujcic et al. .................. | 455/436 |
| 2009/0219889 | A1 * | 9/2009 | Schwarz et al. .............. | 370/331 |

FOREIGN PATENT DOCUMENTS

WO    2008133579 A1    11/2008

OTHER PUBLICATIONS

PCT International Search Report; Application No. PCT/EP2011/063884; Nov. 21, 2011; 3 pages.
PCT Written Opinion of the International Searching Authority; Application No. PCT/EP2011/063884; Nov. 21, 2011; 7 pages.
3GPP TS 36.331 V9.3.0; 3rd Generation Partnership Project; Technical Specification Group Radio Access Network; Evolved Universal Terrestrial Radio Access Network (E-UTRA); Radio Resource Control (RRC); Protocol Specification; Release 9; Jun. 2010; 250 pages.
3GPP TS 36.211 V9.1.0; 3rd Generation Partnership Project; Technical Specification Group Radio Access Network; Evolved Universal Terrestrial Radio Access Network (E-UTRA); Physical Channels and Modulation; Release 9; Mar. 2010; 85 pages.
3GPP TS 45.002 V8.0.0; 3rd Generation Partnership Project; Technical Specification Group GSM/EDGE; Radio Access Network; Multiplexing and Multiple Access on the Radio Path; Release 8; Dec. 2008; 105 pages.

(Continued)

*Primary Examiner* — Vladimir Magloire
(74) *Attorney, Agent, or Firm* — Conley Rose, P.C.; J. Robert Brown, Jr.; Maria L. Sekul

(57) ABSTRACT

A UE is provided. The UE includes a processor configured such that the UE receives one or more wireless signals providing handover synchronization information of a first network component relative to one or more second network components. In another embodiment, a first network component is provided. The first network component includes a processor configured to transmit one or more signals providing handover synchronization information of the first network component relative to one or more second network components. The first network component and the one or more second network components are in different radio access networks.

32 Claims, 6 Drawing Sheets

(56) References Cited

OTHER PUBLICATIONS

PCT Written Opinion of the International Preliminary Examining Authority; Application No. PCT/EP20111063884; Sep. 10, 2012; 7 pages.
3GPP TS 33.401 V11.0.1; 3rd Generation Partnership Project; Technical Specification Group Services and System Aspects; 3GPP System Architecture Evolution (SAE); Security Architecture; Release 11; Jun. 2011; 115 pages.
3GPP TS 36.101 V10.3.0; 3rd Generation Partnership Project; Technical Specification Group Radio Access Network; Evolved Universal Terrestrial Radio Access (E-UTRA); User Equipment (UE) Radio Transmission and Reception; Release 10; Jun. 2011; 237 pages.
3GPP TS 36.321 V10.2.0; 3rd Generation Partnership Project; Technical Specification Group Radio Access Network; Evolved Universal Terrestrial Radio Access (E-UTRA); Medium Access Control (MAC) Protocol Specification; Release 10; Jun. 2011; 54 pages.
PCT International Preliminary Report on Patentability; Application No. PCT/EP2011/063884; Dec. 21, 2012; 28 pages.

* cited by examiner

Frame structure type 1 (FDD) random access configuration for preamble formats 0-3

| PRACH Configuration Index | Preamble Format | System frame number | Subframe number | PRACH Configuration Index | Preamble Format | System frame number | Subframe number |
|---|---|---|---|---|---|---|---|
| 0 | 0 | Even | 1 | 32 | 2 | Even | 1 |
| 1 | 0 | Even | 4 | 33 | 2 | Even | 4 |
| 2 | 0 | Even | 7 | 34 | 2 | Even | 7 |
| 3 | 0 | Any | 1 | 35 | 2 | Any | 1 |
| 4 | 0 | Any | 4 | 36 | 2 | Any | 4 |
| 5 | 0 | Any | 7 | 37 | 2 | Any | 7 |
| 6 | 0 | Any | 1, 6 | 38 | 2 | Any | 1, 6 |
| 7 | 0 | Any | 2, 7 | 39 | 2 | Any | 2, 7 |
| 8 | 0 | Any | 3, 8 | 40 | 2 | Any | 3, 8 |
| 9 | 0 | Any | 1, 4, 7 | 41 | 2 | Any | 1, 4, 7 |
| 10 | 0 | Any | 2, 5, 8 | 42 | 2 | Any | 2, 5, 8 |
| 11 | 0 | Any | 3, 6, 9 | 43 | 2 | Any | 3, 6, 9 |
| 12 | 0 | Any | 0, 2, 4, 6, 8 | 44 | 2 | Any | 0, 2, 4, 6, 8 |
| 13 | 0 | Any | 1, 3, 5, 7, 9 | 45 | 2 | Any | 1, 3, 5, 7, 9 |
| 14 | 0 | Any | 0, 1, 2, 3, 4, 5, 6, 7, 8, 9 | 46 | N/A | N/A | N/A |
| 15 | 0 | Even | 9 | 47 | 2 | Even | 9 |
| 16 | 1 | Even | 1 | 48 | 3 | Even | 1 |
| 17 | 1 | Even | 4 | 49 | 3 | Even | 4 |
| 18 | 1 | Even | 7 | 50 | 3 | Even | 7 |
| 19 | 1 | Any | 1 | 51 | 3 | Any | 1 |
| 20 | 1 | Any | 4 | 52 | 3 | Any | 4 |
| 21 | 1 | Any | 7 | 53 | 3 | Any | 7 |
| 22 | 1 | Any | 1, 6 | 54 | 3 | Any | 1, 6 |
| 23 | 1 | Any | 2, 7 | 55 | 3 | Any | 2, 7 |
| 24 | 1 | Any | 3, 8 | 56 | 3 | Any | 3, 8 |
| 25 | 1 | Any | 1, 4, 7 | 57 | 3 | Any | 1, 4, 7 |
| 26 | 1 | Any | 2, 5, 8 | 58 | 3 | Any | 2, 5, 8 |
| 27 | 1 | Any | 3, 6, 9 | 59 | 3 | Any | 3, 6, 9 |
| 28 | 1 | Any | 0, 2, 4, 6, 8 | 60 | N/A | N/A | N/A |
| 29 | 1 | Any | 1, 3, 5, 7, 9 | 61 | N/A | N/A | N/A |
| 30 | N/A | N/A | N/A | 62 | N/A | N/A | N/A |
| 31 | 1 | Even | 9 | 63 | 3 | Even | 9 |

Figure 2

HANDOVER LATENCY REDUCTION

CROSS-REFERENCE TO RELATED APPLICATIONS

The present application claims priority to U.S. provisional patent application No. 61/373,775 filed Aug. 13, 2010, by Paul McGilly, et al, entitled "Handover Latency Reduction", which is incorporated by reference herein as if reproduced in its entirety.

BACKGROUND

As used herein, terms such as "user equipment" ("UE"), "mobile station" ("MS"), "user agent" ("UA"), "user device," and "user node" might in some cases refer to mobile devices such as mobile telephones, personal digital assistants, hand-held or laptop computers, and similar devices that have telecommunications capabilities. Such terms can also refer to any hardware or software component (alone or in combination) that can terminate a communication session for a user. Such a component might also include one or more associated removable memory modules, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a component might consist of a device itself without such a module. In other cases, terms such as "UE" and the like might refer to devices that have similar capabilities but that are not transportable, such as desktop computers, set-top boxes, or network appliances.

As telecommunications technology has evolved, more advanced network access equipment has been introduced that can provide services that were not previously possible. This network access equipment might include systems and devices that are improvements of the equivalent equipment in a traditional wireless telecommunications system. Specifications regarding such advanced or next generation equipment may be included in evolving wireless communications standards, such as Long-Term Evolution (LTE) and LTE-Advanced (LTE-A). For example, an LTE or LTE-A system might be an Evolved Universal Terrestrial Radio Access Network (E-UTRAN) and include an Evolved Node B (or eNB), a wireless access point, a relay node, or a similar component rather than a traditional base station. As used herein, the term "eNB" may refer to "eNBs" but may also include any of these systems. These components may also be referred to as an access node. The terms "eNB" and "access node" may be synonymous in some embodiments.

BRIEF DESCRIPTION OF THE DRAWINGS

Reference is now made to the following description, taken in connection with the accompanying drawings, wherein like reference numerals may represent like parts.

FIG. 2 is an example of the definition for prach-ConfigIndex in 3GPP TS 36.211 V9.2.0, according to an embodiment of the present disclosure.

DETAILED DESCRIPTION

Figure 1:
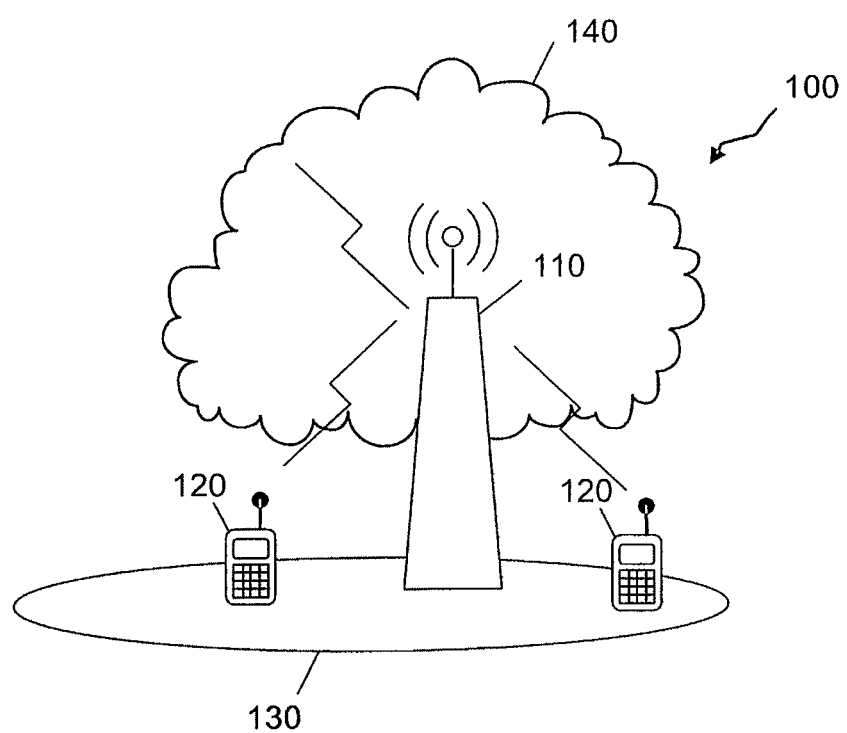
FIG. 1 is a schematic diagram of a radio access network that allows a UE to communicate with other network components and/or devices, according to an embodiment of the present disclosure.

It should be understood at the outset that although illustrative implementations of one or more embodiments of the present disclosure are provided below, the disclosed systems and/or methods may be implemented using any number of techniques. The disclosure should in no way be limited to the illustrative implementations, drawings, and techniques illustrated below, including the exemplary designs and implementations illustrated and described herein, but may be modified within the scope of the appended claims along with their full scope of equivalents.

As used throughout the specification, claims, and Figures, the following acronyms have the following definitions. Unless stated otherwise, all terms are defined by and follow the standards set forth by the Third Generation Partnership Program (3GPP) technical specifications or by the OMA (Open Mobile Alliance).

"CDMA" is defined as "Code Division Multiple Access."
"CR" is defined as "Change Request."
"DL" is defined as "DownLink."
"EDGE" is defined as "Enhanced Data rates for GSM Evolution."
"E-UTRA" is defined as "Evolved Universal Terrestrial Radio Access."
"FDD" is defined as "Frequency Division Duplexing."
"GERAN" is defined as "GSM EDGE Radio Access Network."
"GSM" is defined as "Global System for Mobile communications."
"HO" is defined as "Handover."
"HRPD" is defined as "High Rate Packet Data."
"IE" is defined as "Information Element."
"LSB" is defined as "Least Significant Bit."
"LTE" is defined as "Long Term Evolution."
"MIB" is defined as "Master Information Block."
"PBCH" is defined as "Physical Broadcast Channel."
"PRACH" is defined as "Physical Random Access Channel."
"PSS" is defined as "Primary Synchronization Signal."
"RA" is defined as "Random Access."
"RACH" is defined as "Random Access Channel."
"RAN" is defined as "Radio Access Network."
"RAT" is defined as "Radio Access Technology."
"RRC" is defined as "Radio Resource Control."
"SFN" is defined as "System Frame Number."
"SSS" is defined as "Secondary Synchronization Signal."
"TDD" is defined as "Time Division Duplexing."

"TDMA" is defined as "Time Division Multiple Access."
"UL" is defined as "UpLink."
"UTRA" is defined as "Universal Terrestrial Radio Access."

The term "may," as used herein, can contemplate embodiments in which an object or technique is either required, or possible but not required. Thus, for example, while the term "may" might be used, in some embodiments the term "may" could be replaced by the term "shall" or "must."

In one embodiment, the term "frame polarity" is defined as whether the radio frame has an even or odd SFN (that is, the radio frame has a mod 2 alignment). However, the embodiments specifically contemplate different alignments. For example, the embodiments described herein apply equally well to radio frames with other alignments, such as mod 4, mod 8, or any other radio frame alignment. Thus, as used herein, the term "polarity" is defined as including both mod 2 radio frame alignment and other radio frame alignments, including but not limited to mod 4 and mod 8.

The embodiments described herein relate to mechanisms to reduce the latency for a "Handover-to-E-UTRA" procedure, i.e., handover from a source cell with another RAT to a target E-UTRA cell. In addition, mechanisms are described to reduce the latency for intra-E-UTRA handover, i.e., the source and target cells are both E-UTRA cells, when the source and target cells are not synchronized.

In particular, signaling may be provided to allow a UE to determine whether the source and target cells of the handover are synchronized, and/or to determine a relative polarity of SFNs in the source and target cells. In an embodiment, both determinations may be made based on information received in a single indicator received from the source cell. Still further, if the source and target cells (in a synchronized or unsynchronized system) can determine the timing offset relative to one another, then parameters derived from the offset can be signaled to the UE so that the UE can determine the target cell frame polarity from the current time value of the source cell.

Stated differently, the embodiments relate to inter-RAT handover of a UE to an E-UTRAN. If the E-UTRAN PRACH configuration is not the same in all subframes, it may be beneficial for the UE to obtain the MIB from the E-UTRAN cell before the UE can perform a random access procedure. Obtaining the MIB may add latency to the handover thereby increasing the interruption time. This latency may occur even if the two networks involved in the handover are synchronized, because there is no mechanism to inform the UE that the networks are synchronized or to convey information about the timing relationship between the networks. Thus, the embodiments provide mechanisms to signal to the UE whether or not the networks are synchronized. These mechanisms also convey to the UE sufficient timing information so that the UE can perform a random access procedure in the E-UTRAN without obtaining the MIB. Multiple embodiments are described below.

FIG. 1 is a schematic diagram of a radio access network that allows a UE to communicate with other network components and/or devices according to an embodiment of the disclosure. In particular, FIG. 1 illustrates an embodiment of a RAN 100 that allows a UE to communicate with other network components and/or devices. The RAN 100 may be an LTE or LTE-A system, e.g., as described in 3GPP. For example, an LTE or LTE-A system might include an Evolved Universal Terrestrial Radio Access Network (E-UTRAN) Evolved Node B (or eNB), a wireless access point, or a similar component. FIG. 1 is exemplary and may have other components or arrangements in other embodiments. In an embodiment, the RAN 100 may comprise at least one access device 110 and at least one UE 120, which may be both located within a cell 130. The RAN 100 may also comprise or may be coupled to a network 140.

As described above, the term "access device" refers to any component of the wireless network, such as a traditional base station, a wireless access point, or an LTE or LTE-A Evolved Node B or eNB, that creates a geographical area of reception and transmission coverage allowing a UE 120 or a relay node (not shown) to access or communicate with other components in a telecommunications system, such as a second UE 120. In this document, the terms "access node" and "access device" may be used interchangeably. An access node may include various combinations of hardware and/or software.

The access device 110 may communicate with any UE 120 within the same cell 130, via a direct link, such as in a UTRAN. The cell 130 may be a geographical area of reception and transmission coverage. For instance, the direct link may be a point-to-point link established between the access device 110 and the UE 120 and used to transmit and receive signals between the two. Alternatively, the access devices 110 may communicate with any UE 120 in the same cell 130 over shared links, such as in an E-UTRAN. For instance, the shared links may comprise an uplink shared channel and a downlink shared channel. Additionally, the access device 110 may communicate with other components or devices in order to access a network 140 that might use network protocols or technologies similar to or different from those used by the RAN 100. In an embodiment, the UEs 120 may move about between different cells 130 and their communications may be handed over between the different cells 130, where the UEs 120 may communicate with different access devices 110.

The network 140 may be a wireless network, a wired network, or a combination of any wired or wireless networks. The networks may include a Wireless LAN (WLAN) network, an Ethernet based network, an Internet Protocol (IP) based network, a Digital Subscriber Line (DSL) network, an Optical communications network, and/or any other wireless or wired networks that may be used to exchange communications/data with the UE 120. The communications/data may comprise voice and/or video calls, emails, text/media messages (e.g. using Short Message Service (SMS) or Multimedia Messaging Service (MMS)), IP data, and/or any other data.

General Description of E-UTRA PRACH Configuration

In E-UTRA system, the eNB configures PRACH configuration for a UE through a PRACH-Config Information Element. The PRACH-Config Information Element may be defined in 3GPP TS 36.331 V9.3.0 as the following:

```
-- ASN1START
PRACH-ConfigSIB ::=       SEQUENCE {
   rootSequenceIndex         INTEGER (0..837),
   prach-ConfigInfo          PRACH-ConfigInfo
}
PRACH-Config ::=          SEQUENCE {
   rootSequenceIndex         INTEGER (0..837),
   prach-ConfigInfo          PRACH-ConfigInfo       OPTIONAL  - - Need ON
}
PRACH-ConfigInfo ::=      SEQUENCE {
   prach-ConfigIndex         INTEGER (0..63),
   highSpeedFlag             BOOLEAN,
   zeroCorrelationZoneConfig INTEGER (0..15),
   prach-FreqOffset          INTEGER (0..94)
}
```

Within the above PRACH-Config Information Element, prach-ConfigIndex is used to define the preamble format, the radio frames, and the subframe numbers that may be used to transmit preambles. FIG. 2 is an example of the definition for prach-ConfigIndex in 3GPP TS 36.211 V9.2.0. In this example, PRACH resources may be configured either on every radio frame or only on the even-numbered radio frames. If the E-UTRA cell configures PRACH to be transmitted only on radio frames with even SFNs, then it may be desirable for the UE to know whether the current SFN is even or odd before it can transmit on PRACH to access the system.

Similarly, if the E-UTRA cell configures the PRACH to be transmitted only on odd SFNs (which may be the case for a TDD system), then it may also be desirable for the UE to know whether the current SFN is even or odd before the UE can transmit on the PRACH to access the system.

Inter-RAT HO to E-UTRA

Figure 3:
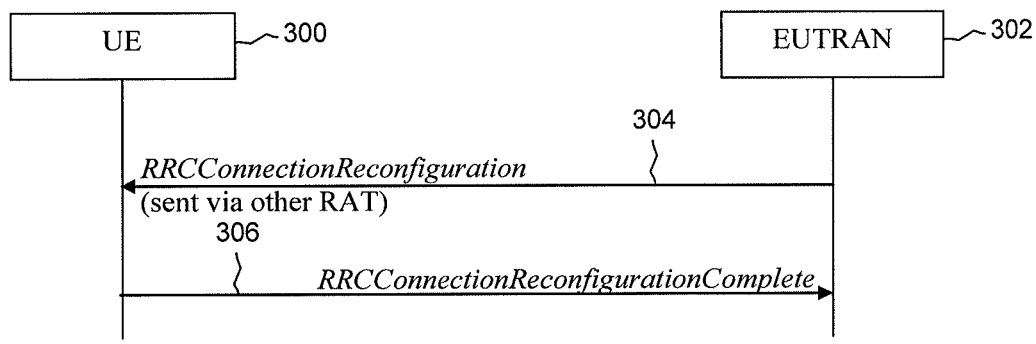
FIG. 3 is a flow diagram illustrating handover of a UE to E-UTRA, according to an embodiment of the present disclosure.

FIG. 3 is a flow diagram illustrating handover of a UE 300 to an E-UTRAN 302 from a network having a RAT other than E-UTRA, according to an embodiment of the present disclosure. The procedure shown in FIG. 3 may be implemented by a processor using instructions stored on a medium, such as the processor and media shown in FIG. 7.

In an embodiment, the E-UTRAN 302 may transmit an RRCConnectionReconfiguration message 304 to the UE 300, possibly via another RAN. In turn, the UE transmits an RRC-ConnectionReconfigurationComplete message 306 to the E-UTRAN. The process terminates thereafter.

The handover to E-UTRAN procedure shown in FIG. 3 may be used when the network hands over the UE from another RAT to E-UTRA. As described in 3GPP TS 36.331 V9.3.0, the RAN using another RAT initiates the handover-to-E-UTRA procedure, in accordance with the specifications applicable for the other RAT. This initiation may be performed by sending the RRCConnectionReconfiguration message via the RAT from which the inter-RAT handover is performed. FIG. 3 shows the signaling flow for the handover-to-E-UTRA procedure.

However, in the case where the target E-UTRA cell configures PRACH to be transmitted only on radio frames with even SFNs or only on radio frames with odd SFNs, it may be desirable for the UE to know whether the current SFN is even or odd before it can access the target E-UTRA cell after handover. Otherwise, the UE might not be able to access the target E-UTRA cell or might only be able to access the target E-UTRA cell after an additional delay. The embodiments described herein relate to addressing these and other issues.

Based on current E-UTRA specifications, when PRACH resources are not provisioned in every radio frame, the UE may assume the source and target radio frames are synchronized at the SFN level within the E-UTRAN. SFN synchronization implies that radio frames from the source and target cells are aligned within less than half a radio frame length, as observed at the UE. Thus, the UE might not have to wait to attempt decoding the PBCH to determine the polarity of the SFN before transmitting on PRACH. However, current specifications do not address the case for inter-RAT handovers.

Figure 4:
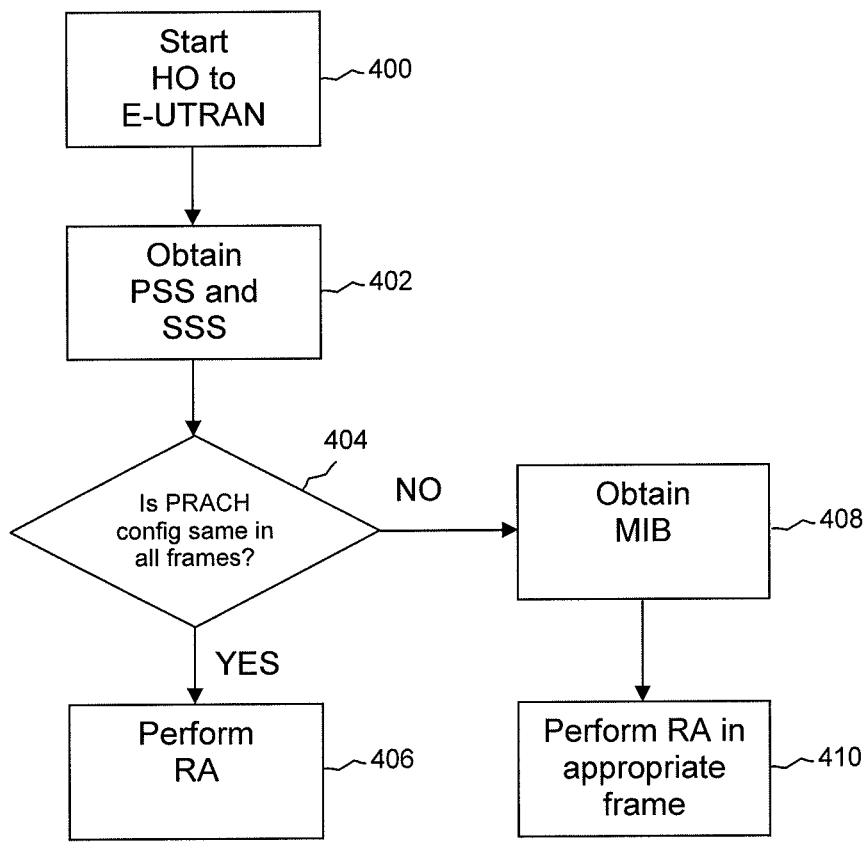
FIG. 4 illustrates a random access procedure for handover to E-UTRA by decoding the E-UTRA PBCH in order to determine the two least significant bits of the E-UTRA System Frame Number, according to an embodiment of the present disclosure.

FIG. 4 illustrates a random access procedure for handover to E-UTRA by decoding the E-UTRA PBCH in order to determine the two least significant bits of the E-UTRA System Frame Number, according to an embodiment of the present disclosure. The procedure shown in FIG. 4 may be implemented by a processor using instructions stored on a medium, such as the processor and media shown in FIG. 7.

The handover procedure to an E-UTRA begins at block 400. The UE obtains the PSS and SSS (block 402). The UE then determines if the PRACH configuration is the same in all radio frames (block 404). If the determination in block 404 is "yes," then the UE performs the random access (block 406). The process terminates thereafter. If the determination to block 404 is "no," then the UE obtains the MIB by decoding the PBCH (block 408). The UE then performs the random access in an appropriate frame (block 410). The process terminates thereafter.

This procedure allows a UE to determine the frame polarity (even or odd) of the target E-UTRA system and transmit on PRACH. However, the PBCH TTI is a 40 ms interval, which leads to increased handover latency and interruption time. The embodiments described herein address and decrease this handover latency.

In an embodiment, a system may exhibit one or more the following properties: (a) the random access opportunities are not the same in all radio frames, (b) zero or more cells are synchronized and zero or more are unsynchronized, (c) reading the SFN of the target cell takes longer than gaining timing synchronization to the target cell, and (d) there is a desire to minimize HO latency and interruption time. In such a system, a signaling mechanism (1) may be needed or desired to inform the UE whether a handover is (un)synchronized and/or (2) may be needed or desired to signal the parameters to determine a timing offset and/or relative relationship of the SFNs between the source and target cells. Furthermore, in such a system a mechanism may be needed or desired to determine when to access the target cell based on the timing of the source cell without waiting to read the SFN of the target cell.

Regarding the signaling mechanism, the synchronized or unsynchronized state of the cells can be (a) sent within the message that instructs the UE to perform the handover or (b) broadcast in system information by the serving cell stating whether it is synchronized to its neighbors. For (b) several bits may be required if some or all the neighbors of the serving cell are not synchronized. For example, the signaling could take one or more of several different forms. For example, the signaling could be (1) a list of all synchronized neighbors that could be signaled, with unlisted neighbors assumed to be unsynchronized. In another example, the signaling could be (2) a list of all unsynchronized neighbors that could be signaled, with unlisted neighbors assumed to be synchronized. In another example, the signaling could be (3) a list of synchronization states of other radio access technologies. In another example, the signaling could be (4) a list of synchronization states per frequency (and optionally per radio access technology). In another example, the signaling could be (5) a range of cell identities (optionally per frequency and/or per radio access technology) that are synchronized, with other neighbors assumed to be unsynchronized. In another example, the signaling could be (6) a range of cell identities (optionally per frequency and/or per radio access technology) that are unsynchronized, with other neighbors assumed to be synchronized. In another example, the signaling could be (7) any other encoding that distinguishes the group of synchronized neighbors from the group of unsynchronized neighbors.

If the source cell and target cell are synchronized, a mechanism may be needed or desired to determine the timing and/or relative relationship of the SFN of the target from the source. The mechanism could take one of several different forms. In an embodiment, the mechanism might be (a) expressed in procedural text of the standard. In another embodiment, the mechanism might be (b) expressed in field descriptions of the standard. Parameters used to calculate the timing offset may be signaled in the handover message, or the relationship could be specified in the handover message.

For handovers between unsynchronized cells, if the cells are able to determine their timing offset at the time of the handover, then the parameters used to calculate the timing offset could be signaled in the handover message, and hence the UE can determine when to access the target cell without waiting to read the SFN from the target cell.

Specific Solutions Related to E-UTRA

If the source and target RANs are synchronized, one of several mechanisms may be used for the UE to determine the frame polarity of the target E-UTRA cell based on system timing and/or frame number of the source RANs. Frame polarity may be defined as whether the radio frame has an even or odd SFN. Determining frame polarity allows the UE to transmit on the PRACH before decoding the PBCH.

If the source and target RANs are unsynchronized, one of several mechanisms may be used for the UE to determine the frame polarity of the target E-UTRA cell and to transmit on the PRACH before decoding the PBCH. This solution also may apply to intra-E-UTRA handover if the source and target cells are not synchronized.

Figure 5:
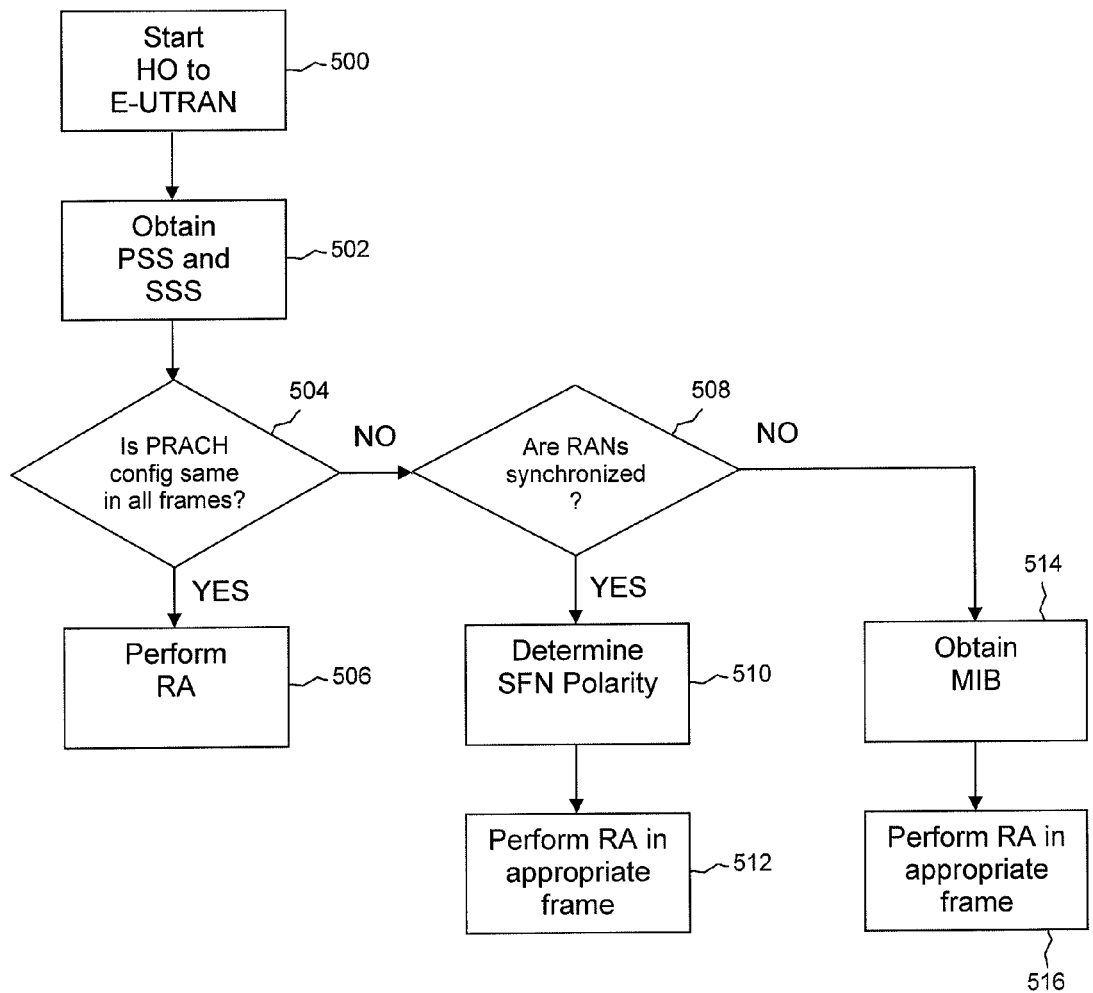
FIG. 5 is a flowchart illustrating a UE's procedure to determine the E-UTRA radio frame to perform random access, synchronization indicators, and polarity determination for PRACH during inter-RAT handover, according to an embodiment of the present disclosure.

FIG. 5 is a flowchart illustrating a UE's procedure to determine the E-UTRA radio frame to perform random access, synchronization indicators, and polarity determination for PRACH during inter-RAT handover, according to an embodiment of the present disclosure. The procedure shown in FIG. 5 may be implemented by a processor using instructions stored on a medium, such as the processor and media shown in FIG. 7.

The process begins as the UE begins a handover procedure to an E-UTRAN (block 500). The UE obtains the PSS and SSS (block 502). The UE determines whether the PRACH config is the same in all frames (block 504). If "yes," then the UE performs the RA (block 506). The process terminates thereafter.

If "no", then the UE determines whether the RANs are synchronized (block 508). If "yes", then the UE determines the SFN polarity (block 510). The UE then performs the RA in the appropriate radio frame (block 512). The process terminates thereafter.

Returning to block 508, if the RANs are not synchronized, then the UE obtains the MIB (block 514). The UE then performs the RA in the appropriate radio frame (block 516). The process terminates thereafter.

Synchronization Indicator

A synchronization indicator may be used to indicate whether the source RAN is synchronized with the target E-UTRA cell for handover purposes. The synchronization indicator can be transmitted either in a dedicated message like a handover command or in a broadcast message in the source system.

Synchronization Indicator in Handover Command to E-UTRA

One embodiment is to add the synchronization indicator as part of RRCConnectionReconfiguration message that is sent to the UE during the handover-to-E-UTRA procedure. The synchronization indicator indicates whether the source cell and target cell are synchronized. The following information element (IE) is an example of adding the synchronization flag as the synchronization indicator in the IE MobilityControlInfo, which is transmitted within RRCConnectionReconfiguration, with changes shown in italics and underlined.

```
-- ASN1START
MobilityControlInfo ::=    SEQUENCE {
    targetPhysCellId           PhysCellId,
    carrierFreq                CarrierFreqEUTRA              OPTIONAL, -- Cond HO-toEUTRA
    carrierBandwidth           CarrierBandwidthEUTRA         OPTIONAL, -- Cond HO-toEUTRA
    additionalSpectrumEmission AdditionalSpectrumEmission    OPTIONAL, -- Cond HO-toEUTRA
    t304                       ENUMERATED {
                                   ms50, ms100, ms150, ms200, ms500, ms1000,
                                   ms2000, spare1},
    newUE-Identity             C-RNTI,
    radioResourceConfigCommon  RadioResourceConfigCommon,
    rach-ConfigDedicated       RACH-ConfigDedicated          OPTIONAL, -- Need OP
    ...,
    synchronisedInterRatHo     BOOLEAN                       OPTIONAL, -- Cond SyncHo
}
CarrierBandwidthEUTRA ::= SEQUENCE {
    dl-Bandwidth               ENUMERATED {
                                   n6, n15, n25, n50, n75, n100, spare10,
                                   spare9, spare8, spare7, spare6, spare5,
                                   spare4, spare3, spare2, spare1},
    ul-Bandwidth               ENUMERATED {
                                   n6, n15, n25, n50, n75, n100, spare10,
                                   spare9, spare8, spare7, spare6, spare5,
                                   spare4, spare3, spare2, spare1}   OPTIONAL -- Need OP
}
CarrierFreqEUTRA ::= SEQUENCE {
    dl-CarrierFreq             ARFCN-ValueEUTRA,
    ul-CarrierFreq             ARFCN-ValueEUTRA              OPTIONAL -- Cond FDD
}
-- ASN1STOP
```

Table 1 below shows exemplary MobilityControlInfo field descriptions for an IE according to an embodiment of the present disclosure. Table 1 is for the IE described above, with changes in the table shown in italics and underlined.

TABLE 1

MobilityControlInfo field descriptions

*t304*
Timer T304 as described in section 7.3. ms50 corresponds with 50 ms, ms100 corresponds with 100 ms and so on.
*dl-Bandwidth*
Parameter: *Downlink bandwidth*, see TS 36.101 [42].
*ul-Bandwidth*
Parameter: *Uplink bandwidth*, see TS 36.101 [42, table 5.6-1]. For TDD, the parameter is absent and it is equal to downlink bandwidth. If absent for FDD, apply the same value as applies for the downlink bandwidth.
*rach-ConfigDedicated*
The dedicated random access parameters. If absent the UE applies contention based random access as specified in TS 36.321 [6].
*carrierBandwidth*
Provides the parameters *Downlink bandwidth*, and *Uplink bandwidth*, see TS 36.101 [42].
*synchronisedInterRatHo*
*TRUE if the source cell is synchronised with the target E-UTRA cell. FALSE otherwise*

TABLE 1-continued

MobilityControlInfo field descriptions

| Conditional presence | Explanation |
| --- | --- |
| FDD | The field is mandatory with default value (the default duplex distance defined for the concerned band, as specified in TS 36.101 [42]) in case of "FDD"; otherwise the field is not present. |
| HO-toEUTRA | The field is mandatory present in case of inter-RAT handover to E-UTRA; otherwise the field is optionally present, need ON. |
| SyncHo | *The field is present for synchronised inter-RAT handover to E-UTRA; otherwise it is not present.* |

Alternatively, the synchronization indicator may be added as an optional field. Below is an example of a MobilityControlInfo IE for this embodiment, with changes in italics and underlined:

```
-- ASN1START
MobilityControlInfo ::=        SEQUENCE {
    targetPhysCellId           PhysCellId,
    carrierFreq                CarrierFreqEUTRA          OPTIONAL, -- Cond HO-toEUTRA
    carrierBandwidth           CarrierBandwidthEUTRA     OPTIONAL, -- Cond HO-toEUTRA
    additionalSpectrumEmission AdditionalSpectrumEmission OPTIONAL, -- Cond HO-toEUTRA
    t304                       ENUMERATED {
                                   ms50, ms100, ms150, ms200, ms500, ms1000,
                                   ms2000, spare1},
    newUE-Identity             C-RNTI,
    radioResourceConfigCommon  RadioResourceConfigCommon,
    rach-ConfigDedicated       RACH-ConfigDedicated      OPTIONAL, -- Need OP
    ...,
    synchronisedInterRatHo     ENUMERATED { TRUE }       OPTIONAL  -- Cond SyncHo
}
CarrierBandwidthEUTRA ::=      SEQUENCE {
    dl-Bandwidth               ENUMERATED {
                                   n6, n15, n25, n50, n75, n100, spare10,
                                   spare9, spare8, spare7, spare6, spare5,
                                   spare4, spare3, spare2, spare1},
    ul-Bandwidth               ENUMERATED {
                                   n6, n15, n25, n50, n75, n100, spare10,
                                   spare9, spare8, spare7, spare6, spare5,
                                   spare4, spare3, spare2, spare1}   OPTIONAL -- Need OP
}
CarrierFreqEUTRA ::=           SEQUENCE {
    dl-CarrierFreq             ARFCN-ValueEUTRA,
    ul-CarrierFreq             ARFCN-ValueEUTRA          OPTIONAL -- Cond FDD
}
-- ASN1STOP
```

Table 2 below shows exemplary MobilityControlInfo field descriptions for an IE according to an embodiment of the present disclosure. Table 2 is for the IE described above, with changes in the table shown in italics and underlined.

TABLE 2

MobilityControlInfo field descriptions

*t304*
Timer T304 as described in section 7.3. ms50 corresponds with 50 ms, ms100 corresponds with 100 ms and so on.
*dl-Bandwidth*
Parameter: *Downlink bandwidth*, see TS 36.101 [42].
*ul-Bandwidth*
Parameter: *Uplink bandwidth*, see TS 36.101 [42, table 5.6-1]. For TDD, the parameter is absent and it is equal to downlink bandwidth. If absent for FDD, apply the same value as applies for the downlink bandwidth.
*rach-ConfigDedicated*
The dedicated random access parameters. If absent the UE applies contention based random access as specified in TS 36.321 [6].
*carrierBandwidth*
Provides the parameters *Downlink bandwidth*, and *Uplink bandwidth*, see TS 36.101 [42].
*synchronisedInterRatHo*
*Indicates that the source cell is synchronised with the target E-UTRA cell.*

| Conditional presence | Explanation |
| --- | --- |
| FDD | The field is mandatory with default value (the default duplex distance defined for the concerned band, as specified in TS 36.101 [42]) in case of "FDD"; otherwise the field is not present. |
| HO-toEUTRA | The field is mandatory present in case of inter-RAT handover to E-UTRA; otherwise the field is optionally present, need ON. |
| *SyncHo* | *The field is present for synchronised inter-RAT handover to E-UTRA; otherwise it is not present.* |

Synchronization Indicator in Broadcast System Information Message Transmitted in Source RAN Another embodiment may be to add the synchronization indicator in broadcast system information in the source cell to indicate whether the source cell is synchronized to the target E-UTRA network. This indicator may be added to UTRA, CDMA2000, and GERAN system information broadcasts. In addition, an indicator list may be broadcast, which includes the synchronization indicators for different neighbor E-UTRA cells.

For example, a synchronizedHO BOOLEAN may be added to the broadcast system information. If the synchronizedHO BOOLEAN is set to TRUE (or if the optional enumerated (TRUE) field is present), the neighbor E-UTRA cells listed in the broadcast system information are cells that are synchronized with the current cell. Other non-listed E-UTRA neighbor cells are considered not synchronized with the current cell.

However, if synchronizedHO BOOLEAN is set to FALSE (or if the optional enumerated (FALSE) field is present), the neighbor E-UTRA cells listed in the broadcast system information are cells that are not synchronized with the current cell. Other non-listed E-UTRA neighbor cells are considered synchronized with the current cell. In another embodiment, if synchronizedHO BOOLEAN is set to FALSE (or if the optional enumerated (FALSE) field is present), then all neighbor E-UTRA cells (regardless of whether or not they are listed in the broadcast system information) are cells that are not synchronized with the current cell.

In another embodiment, synchronizedHO BOOLEAN is not included in the broadcast system information. Only neighbor E-UTRA cells listed in the broadcast system may be cells synchronized with the current cell. In yet another embodiment, only neighbor E-UTRA cells listed in the broadcast system may be cells that are not synchronized with the current cell.

Mechanisms to Determine the Polarity of E-UTRA SFN When the Source Cell and Target E-UTRA Cell are Synchronized If the source cell and target E-UTRA cell are synchronized, the UE can determine the polarity of the target E-UTRA cell SFN based on the system timing and/or frame number in the source RAT. A mechanism for determining the polarity of a target E-UTRA cell SFN when a source cell is UTRA will now be described. In an UTRA system, the frame length may be 10 ms, which may be the same as the radio frame length in the E-UTRA system. The UTRA frame number may be 12 bits and the E-UTRA SFN may be 10 bits. The frame numbers do not need to be the same, but the least-significant bit (LSB) is specified to be identical. Thus, if the LSB of the source UTRA frame number is 0, the UE may interpret the LSB as corresponding to an even-numbered radio frame in the target E-UTRA cell.

If the LSB of the source UTRA frame number is 1, the UE may interpret it as corresponding to an odd-numbered radio frame of the target E-UTRA cell. Alternatively, the source and target cells could be specified to be aligned with the opposite polarity of the LSB. The following is an example of a CR in TS36.211 which may be used to describe the changes in the specifications for the matching polarity alternative. Changes are shown in italics and underlined.

5.7.1 Time and Frequency Structure

For frame structure type 1 with preamble format 0-3, there is at most one random access resource per subframe. Table 5.7.1-2 lists the preamble formats according to Table 5.7.1-1 and the subframes in which random access preamble transmission is allowed for a given configuration in frame structure type 1. The parameter prach-ConfigurationIndex is given by higher layers. The start of the random access preamble shall be aligned with the start of the corresponding uplink subframe at the UE assuming $N_{TA}=0$, where $N_{TA}$ is defined in section 8.1. For PRACH configuration 0, 1, 2, 15, 16, 17, 18, 31, 32, 33, 34, 47, 48, 49, 50 and 63 the UE may for intra-EUTRA handover purposes assume an absolute value of the relative time difference between radio frame i in the current cell and the target cell of less than 153600 $T_s$. For inter-RAT handover to EUTRA, for PRACH configuration 0, 1, 2, 15, 16, 17, 18, 31, 32, 33, 34, 47, 48, 49, 50 and 63, *and if the target E-UTRA cell is synchronized with the source UTRA cell for handover purposes, the UE may assume an absolute value of the relative time difference between the start of an odd (or even) radio frame in the current UTRA cell and the start of an odd (or even) radio frame in the target EUTRA cell of less than 153600 $T_s$.* The first physical resource block $n_{PRB}^{RA}$ allocated to the PRACH opportunity considered for preamble format 0, 1, 2 and 3 is defined as $n_{PRB}^{RA}=n_{PRB\ offset}^{RA}$, where the parameter prach-FrequencyOffset $n_{PRBoffset}^{RA}$ is expressed as a physical resource block number configured by higher layers and fulfilling $0 \le n_{PRBoffset}^{RA} \le N_{RB}^{UL}-6$.

. . .

For frame structure type 2 with preamble format 0-4, there might be multiple random access resources in an UL subframe (or UpPTS for preamble format 4) depending on the UL/DL configuration [see table 4.2-2]. Table 5.7.1-3 lists PRACH configurations allowed for frame structure type 2 where the configuration index corresponds to a certain combination of preamble format, PRACH density value, $D_{RA}$, and version index, $r_{RA}$. The parameter prach-ConfigurationIndex is given by higher layers. For frame structure 2 PRACH configuration 0, 1, 2, 20, 21, 22, 30, 31, 32, 40, 41, 42, 48, 49 and 50, the UE may for intra-EUTRA handover purposes assume an absolute value of the relative time difference between radio frame i in the current cell and the target cell is less than 153600 $T_s$. For inter-RAT handover to EUTRA, for PRACH configuration 0, 1, 2, 20, 21, 22, 30, 31, 32, 40, 41, 42, 48, 49 and 50, and if the target E-UTRA cell is synchronized with the source UTRA cell for handover purposes, the UE may assume an absolute value of the relative time difference between the start of an odd (or even) radio frame in the current UTRA cell and the start of an odd (or even) radio frame in the target EUTRA cell of less than 153600 $T_s$.

Furthermore, the changes for the matching polarity alternative can be incorporated in the procedural description in TS36.331 along with the synchronization indicator described below. Following is an example of one of the embodiments, with changes shown in italics and underlined:

5.4.2.3 Reception of the RRCConnectionReconfiguration by the UE

If the UE is able to comply with the configuration included in the RRCConnectionReconfiguration message, the UE shall:

1> apply the default physical channel configuration as specified in 9.2.4;

1> apply the default semi-persistent scheduling configuration as specified in 9.2.3;

1> apply the default MAC main configuration as specified in 9.2.2;

1> start timer T304 with the timer value set to t304, as included in the mobilityControlInfo;

1> consider the target cell to be one on the frequency indicated by the carrierFreq with a physical cell identity indicated by the targetPhysCellId;

1> start synchronising to the DL of the target cell;

1> set the C-RNTI to the value of the newUE-Identity;

1> for the target cell, apply the downlink bandwidth indicated by the dl-Bandwidth;

1> for the target cell, apply the uplink bandwidth indicated by (the absence or presence of) the ul-Bandwidth;

1> for the target cell, if synchronisedInterRATHo indicates that the target cell is synchronized with the source cell:

2> if the prach-ConfigurationIndex has one of the following values for FDD: 0, 1, 2, 15, 16, 17, 18, 31, 32, 33, 34, 47, 48, 49, 50 and 63 or one of the following values for TDD: 0, 1, 2, 20, 21, 22, 30, 31, 32, 40, 41, 42, 48, 49 and 50:

3> determine the E-UTRA SFN as even or odd as follows: if the LSB of the UTRA SFN is 0, the corresponding E-UTRA SFN is an even value. If the LSB of the UTRA frame number is 1, the corresponding E-UTRA SFN is an odd value.

3> The UE is not required to determine the SFN of the target cell by acquiring system information from that cell before performing RACH access in the target cell;

1> else

2> the UE is required to determine the SFN of the target cell by acquiring system information from that cell before performing RACH access in the target cell.

1> perform the radio resource configuration procedure as specified in 5.3.10;

1> forward the nas-SecurityParamToEUTRA to the upper layers;

1> derive the $K_{eNB}$ key, as specified in TS 33.401 [32];

1> derive the $K_{RRCint}$ key associated with the integrityProtAlgorithm, as specified in TS 33.401 [32];

1> derive the $K_{RRCenc}$ key and the $K_{UPenc}$ key associated with the cipheringAlgorithm, as specified in TS 33.401 [32];

1> configure lower layers to apply the indicated integrity protection algorithm and the $K_{RRCint}$ key immediately, i.e. the indicated integrity protection configuration shall be applied to all subsequent messages received and sent by the UE, including the message used to indicate the successful completion of the procedure;

1> configure lower layers to apply the indicated ciphering algorithm, the $K_{RRCenc}$ key and the $K_{UPenc}$ key immediately, i.e. the indicated ciphering configuration shall be applied to all subsequent messages received and sent by the UE, including the message used to indicate the successful completion of the procedure;

1> if the RRCConnectionReconfiguration message includes the measConfig:

2> perform the measurement configuration procedure as specified in 5.5.2;

1> if the RRCConnectionReconfiguration message includes the reportProximityConfig:

2> perform the proximity indication configuration in accordance with the received reportProximityConfig;

1> submit the RRCConnectionReconfiguration-Complete message to lower layers for transmission using the new configuration;

1> if the RRCConnectionReconfiguration message does not include the rlf-TimersAndConstants:

2> use the default values specified in 9.2.5 for timer T310, T311 and constant N310, N311;

1> if MAC successfully completes the random access procedure:

2> stop timer T304;

2> apply the parts of the CQI reporting configuration, the scheduling request configuration and the sounding RS configuration that do not require the UE to know the SFN of the target cell, if any;

2> apply the parts of the measurement and the radio resource configuration that require the UE to know the SFN of the target cell (e.g. measurement gaps, periodic CQI reporting, scheduling request configuration, sounding RS configuration), if any, upon acquiring the SFN of the target cell;

2> enter E-UTRA RRC_CONNECTED, upon which the procedure ends;

Furthermore, the changes may be incorporated in the field description of the MobilityControlInfo IE in TS36.331 as part of the synchronization indicator description. The following example shows one embodiment of a MobilityControlInfo IE for determining the LSB of E-UTRAN SFN from the UTRA frame number, with changes shown in italics and underlined.

```
-- ASN1START
MobilityControlInfo ::=    SEQUENCE {
    targetPhysCellId        PhysCellId,
    carrierFreq             CarrierFreqEUTRA           OPTIONAL, -- Cond
HO-toEUTRA
    carrierBandwidth        CarrierBandwidthEUTRA      OPTIONAL, -- Cond HO-
toEUTRA
    additionalSpectrumEmission  AdditionalSpectrumEmission  OPTIONAL, -- Cond
HO-toEUTRA
    t304                    ENUMERATED {
                                ms50, ms100, ms150, ms200, ms500, ms1000,
                                ms2000, spare1},
    newUE-Identity          C-RNTI,
    radioResourceConfigCommon   RadioResourceConfigCommon,
    rach-ConfigDedicated    RACH-ConfigDedicated       OPTIONAL, -- Need
OP
    ...,
    synchronisedInterRatHo  ENUMERATED { TRUE }        OPTIONAL   -- Cond
SyncHo
}
CarrierBandwidthEUTRA ::=  SEQUENCE {
    dl-Bandwidth            ENUMERATED {
                                n6, n15, n25, n50, n75, n100, spare10,
                                spare9, spare8, spare7, spare6, spare5,
                                spare4, spare3, spare2, spare1},
    ul-Bandwidth            ENUMERATED {
                                n6, n15, n25, n50, n75, n100, spare10,
                                spare9, spare8, spare7, spare6, spare5,
                                spare4, spare3, spare2, spare1}   OPTIONAL --
Need OP
}
CarrierFreqEUTRA ::=       SEQUENCE {
    dl-CarrierFreq          ARFCN-ValueEUTRA,
    ul-CarrierFreq          ARFCN-ValueEUTRA           OPTIONAL   -- Cond
FDD
}
-- ASN1STOP
```

Table 3 below shows exemplary MobilityControlInfo field descriptions for an IE according to an embodiment of the present disclosure. Table 3 is for the IE described above, with changes in the table shown in italics and underlined.

TABLE 3

MobilityControlInfo field descriptions

*t304*
Timer T304 as described in section 7.3. ms50 corresponds with 50 ms, ms100 corresponds with 100 ms and so on.
*dl-Bandwidth*
Parameter: *Downlink bandwidth*, see TS 36.101 [42].
*ul-Bandwidth*
Parameter: *Uplink bandwidth*, see TS 36.101 [42, table 5.6-1]. For TDD, the parameter is absent and it is equal to downlink bandwidth. If absent for FDD, apply the same value as applies for the downlink bandwidth.
*rach-ConfigDedicated*
The dedicated random access parameters. If absent the UE applies contention based random access as specified in TS 36.321 [6].
*carrierBandwidth*
Provides the parameters *Downlink bandwidth*, and *Uplink bandwidth*, see TS 36.101 [42].
*synchronisedInterRatHo*
*Indicates that the source cell is synchronised with the target EUTRA cell. For HO from UTRA, the UE may assume that the LSB of E-UTRASFN = LSB of UTRASFN*

| Conditional presence | Explanation |
|---|---|
| FDD | The field is mandatory with default value (the default duplex distance defined for the concerned band, as specified in TS 36.101 [42]) in case of "FDD"; otherwise the field is not present. |
| HO-toEUTRA | The field is mandatory present in case of inter-RAT handover to E-UTRA; otherwise the field is optionally present, need ON. |

TABLE 3-continued

MobilityControlInfo field descriptions

| | |
|---|---|
| *SyncHo* | *The field is present for synchronised inter-RAT handover to E-UTRA; otherwise it is not present.* |

In another embodiment, if a UTRA cell and an E-UTRA cell are considered to be frame-synchronized, the ten least significant bits of the 12-bit UTRA frame number may be considered to be identical to the 10-bit E-UTRA frame number.

Determine the Polarity of E-UTRA System Frame Number When Source Cell is GERAN

In a GERAN system, a 26-multiframe may have a time length of 120 ms as defined in 3GPP TS 45.002 V8.0.0. Thus, if the source GERAN cell is specified to synchronize the start of each 26-multiframe with an even-numbered radio frame in the target E-UTRA system, the UE can derive the polarity of the target E-UTRA cell based on the 26-multiframe number in the source GERAN cell. This procedure allows the UE to transmit on the PRACH in the target E-UTRA cell without waiting to decode the PBCH. Alternatively, the start of each 26-multiframe can be specified to be synchronized with an odd-numbered radio frame in an E-UTRAN.

The following is an example of a CR for TS36.211, which may be used to describe the changes in the specifications. Changes are shown in italics and underlined. Alternatively, this mechanism can be specified in either the procedural text in TS 36.331 or in the field descriptions of TS 36.331, similar to the examples in the previous section.

5.7.1 Time and Frequency Structure
...

For frame structure type 1 with preamble format 0-3, there is at most one random access resource per subframe. Table 5.7.1-2 lists the preamble formats according to Table 5.7.1-1 and the subframes in which random access preamble transmission is allowed for a given configuration in frame structure type 1. The parameter prach-ConfigurationIndex is given by higher layers. The start of the random access preamble shall be aligned with the start of the corresponding uplink subframe at the UE assuming $N_{TA}=0$, where $N_{TA}$ is defined in section 8.1. For PRACH configurations 0, 1, 2, 15, 16, 17, 18, 31, 32, 33, 34, 47, 48, 49, 50 and 63 the UE may for intra-EUTRA handover purposes assume an absolute value of the relative time difference between radio frame i in the current cell and the target cell of less than $153600 \cdot T_s$. For PRACH configuration 0, 1, 2, 15, 16, 17, 18, 31, 32, 33, 34, 47, 48, 49, 50 and 63, and if the target E-UTRA cell is synchronized with the source GERAN cell for handover purposes, the UE may assume an absolute value of the relative time difference between the start of each 26-multiframe in the current GERAN cell, where a 26-multiframe is defined in Section 4.3.3 of 3GPP TS 45.002 V8.0.0, and the start of an even-numbered EUTRA frame in the target EUTRA cell of less than $153600\ T_s$. The first physical resource block $n_{PRB}^{RA}$ allocated to the PRACH opportunity considered for preamble formats 0, 1, 2 and 3 is defined as $n_{PRB}^{RA}= n_{PRB\ offset}^{RA}$, where the parameter prach-FrequencyOffset, $n_{PRBoffset}^{RA}$ is expressed as a physical resource block number configured by higher layers and fulfilling $0 \le n_{PRBoffset}^{RA} \le N_{RB}^{UL}-6$.

...

For frame structure type 2 with preamble formats 0-4, there might be multiple random access resources in an UL subframe (or UpPTS for preamble format 4) depending on the UL/DL configuration [see table 4.2-2]. Table 5.7.1-3 lists PRACH configurations allowed for frame structure type 2 where the configuration index corresponds to a certain combination of preamble format, PRACH density value, $D_{RA}$ and version index, $r_{RA}$. The parameter prach-ConfigurationIndex is given by higher layers. For frame structure type 2 with PRACH configuration 0, 1, 2, 20, 21, 22, 30, 31, 32, 40, 41, 42, 48, 49 or 50, the UE may for intra-EUTRA handover purposes assume an absolute value of the relative time difference between radio frame i in the current cell and the target cell is less than $153600 \cdot T_s$. For frame structure 2 PRACH configuration 0, 1, 2, 20, 21, 22, 30, 31, 32, 40, 41, 42, 48, 49 and 50, and if the target E-UTRA cell is synchronized with the source GERAN cell for handover purposes, the UE may assume an absolute value of the relative time difference between the start of each 26-multiframe in the current GERAN cell (where a 26-multiframe is defined in Section 4.3.3 of 3GPP TS 45.002 V8.0.0) and the start of an even-numbered EUTRA frame in the target EUTRA cell of less than $153600\ T_s$.

Determine the Polarity of E-UTRA SFN When Source Cell is CDMA2000-1xRTT

In a CDMA2000-1xRTT system, the frame length may be 20 ms. There may be at least two ways to determine the frame polarity of the target E-UTRA system as long as the CDMA2000-1xRTT frame timing and the E-UTRA radio frame timing are synchronized.

In one embodiment, the UE may determine the target E-UTRA frame boundary based on the half-frame boundary in the source CDMA2000-1xRTT system. For example, the UE can assume that the first half of the CDMA2000-1xRTT frame corresponds to an odd-numbered radio frame in the target E-UTRA cell and that the second half of the CDMA2000-1xRTT frame corresponds to an even-numbered radio frame in the target E-UTRA cell. Alternatively, the UE can assume that first half of the CDMA2000-1xRTT frame corresponds to an even-numbered radio frame in the target E-UTRA cell and that the second half of the CDMA2000-1xRTT frame corresponds to an odd-numbered radio frame in the target E-UTRA cell.

In another embodiment, the UE may determine the frame polarity of the target E-UTRA system based on the CDMA system time in the source CDMA2000-1xRTT system. For example, if ceiling ('CDMA system time'/10 ms) has an odd value, then the UE may assume it corresponds to an odd-numbered radio frame in the target E-UTRA cell; else if ceiling ('CDMA system time'/10 ms) has an even value, then the UE may assume it corresponds to an even-numbered radio frame in the target E-UTRA system. Other examples include using floor or modular functions.

For both embodiments described above, the relative time offset between the CDMA2000-1xRTT 20 ms frame boundary and the E-UTRA radio frame boundary may be additionally signaled to the UE. The UE may first adjust the frame boundary or system time of the source CDMA2000-1xRTT cell with this relative time offset, and then use the adjusted results to determine the polarity of the SFN of the target E-UTRA cell.

Determine the Polarity of E-UTRA SFN When Source Cell is CDMA2000-HRPD

In a CDMA2000-HRPD (i.e., 1xEV-DO) system, the frame length may be 26.667 ms, which includes 16 slots where each slot is 1.667 ms. Six HRPD slots may equal 10 ms.

In one embodiment, the UE may calculate the HRPD slot number based on the CDMA system time using the following formula: (floor ('CDMA system time'/'slot duration'). Then the UE may determine the frame polarity (even/odd) of the target E-UTRA system based on slot number. For example, if floor ('slot number'/6) is an odd value, then the UE assumes it corresponds to an odd-numbered radio frame in the target E-UTRA cell; else if floor ('slot number'/6) is an even value, then the UE assumes it corresponds to an even-numbered radio frame in the target E-UTRA cell.

In another embodiment, the UE may determine the frame polarity of the target E-UTRA system based on the CDMA system time in the source CDMA2000-1xRTT system as described below. For example, if ceiling ('CDMA system time'/10 ms) is an odd value, then the UE may assume it corresponds to an odd-numbered radio frame in the target E-UTRA cell; else if ceiling ('CDMA system time'/10 ms) is an even value, then the UE may assume it corresponds to an even-numbered radio frame in the target E-UTRA cell. Other examples include using floor or modular function.

For both embodiments, the relative time offset between the CDMA2000-HRPD 10 ms system time boundary and the E-UTRA radio frame boundary may be additionally signaled to the UE. The UE first may adjust the frame boundary or system time of the source CDMA2000-HRPD cell with this relative time offset and then use the adjusted results to determine the polarity of the SFN of the target E-UTRA cell.

Figure 6:
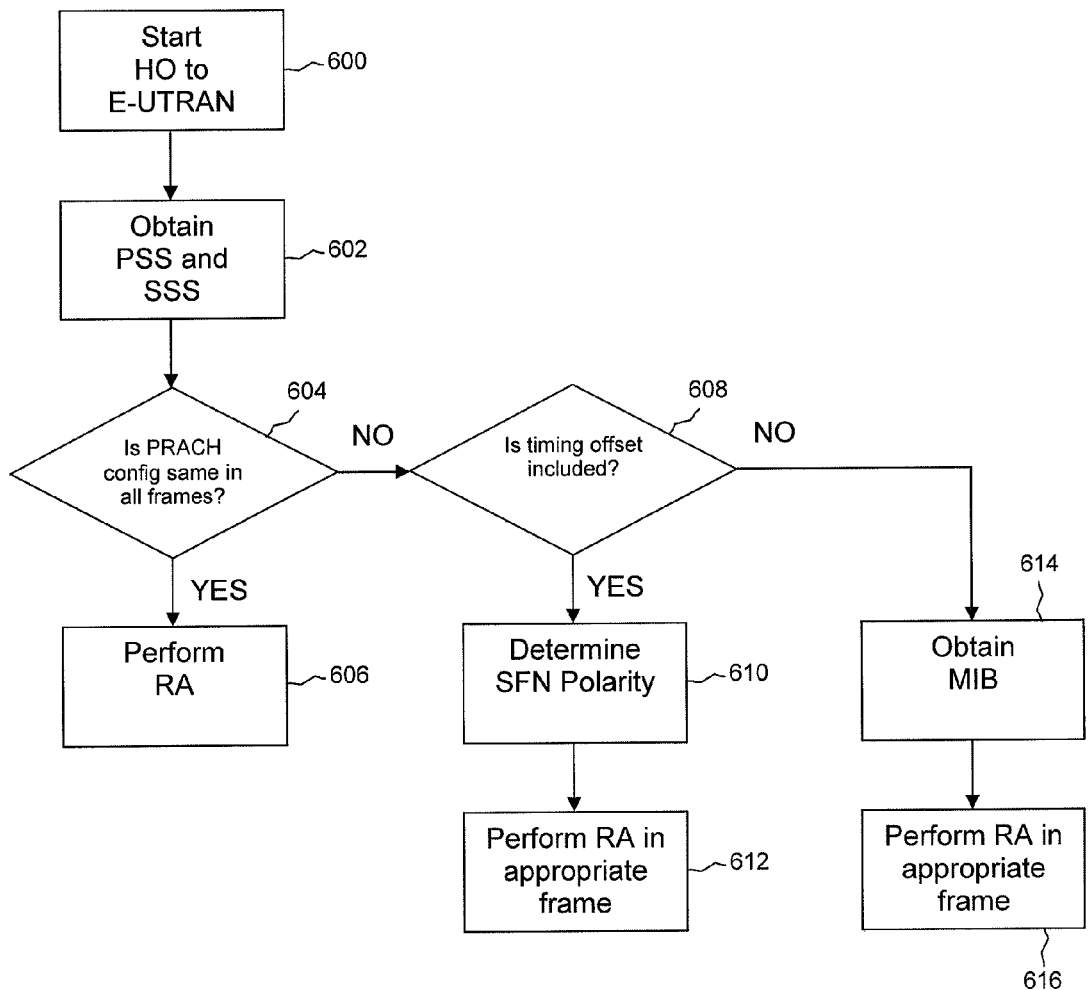
FIG. 6 is a flowchart illustrating an exemplary UE procedure during inter-RAT handover to determine the E-UTRA radio frame to perform random access, including a timing offset indication for the PRACH configuration, according to an embodiment of the present disclosure.

Mechanism to Determine the Polarity of E-UTRA SFN When the Source and Target System are not Synchronized FIG. 6 is a flowchart illustrating an exemplary UE procedure during inter-RAT handover to determine the radio frame to perform RA, including a timing offset indication for the PRACH configuration, according to an embodiment of the present disclosure. The procedure shown in FIG. 6 may be implemented by a processor using instructions stored on a medium, such as the processor and media shown in FIG. 7.

The process begins as the UE starts a handover procedure to an E-UTRAN (block 600). The UE obtains the PSS and SSS (block 602). The UE then makes a determination whether the PRACH config is the same in all frames (block 604). If "yes," then the UE performs the RA (block 606). The process terminates thereafter.

Returning to block 604, if the PRACH config is not the same in all radio frames, then the UE determines if the timing offset is included (block 608). If "yes," then the UE determines the SFN polarity (block 610). The UE then performs the RA in an appropriate frame (block 612). The process terminates thereafter.

Returning to block 608, if the UE determines that the timing offset is not included, then the UE obtains the MIB (block 614). The UE then performs the RA in an appropriate radio frame (block 616). The process terminates thereafter.

Note that this embodiment has an optional structure. If a synchronization indication is not present, then the handover may be unsynchronized. If the synchronization indication is present, then the branch and value of the choice structure gives the parameters to determine the alignment of the cells. Thus, in an embodiment, there is no separate indicator to signal whether the cells are synchronized or not. Accordingly, in addition to the synchronization indication being signaled and the alignment being separately signaled, there may be a mechanism to signal both of them in one object. Furthermore, if the networks are always synchronized (but not aligned), then only the parameters to determine the offset might need to be signaled and no synchronization indicator is needed. Additionally, if source and target cells (in a synchronized or unsynchronized system) can determine their timing offset, then parameters derived from the offset can be signaled to the UE so that it can determine the target cell polarity from the current time value of the source cell.

In the event that a synchronized network (either intra-RAT or inter-RAT) is not being maintained, it may be expected that the frame timing of different base stations would gradually drift relative to each other. For example, one base station's frames may be slightly shorter than 10 ms, while a second base station's frames may be slightly longer than 10 ms. Even if the frame numbering of the two base stations is aligned at start-up, their frame numberings may gradually diverge due to the slight difference in actual frame lengths. In such a non-synchronized network, it may still be possible to initiate an E-UTRA random access prior to acquiring the target cell's MIB (for SFN information) using the following approach.

First, during the handover negotiation on the network side, the source cell and target cell determine their frame numbering and system timing relative to each other. This can be performed over the backhaul link or by wirelessly reading the MIB of the other cell. This can be performed periodically or upon demand. In another alternate embodiment, each cell may be provided the SFN and frame timing information of its neighbor cells from a network entity, such as a self-organizing network (SON) manager or some OA&M (Operations, Administration & Management) entity.

Second, as part of the handover command (e.g., as part of the MobilityControlInfo information element), the UE may be informed of a timing adjustment that it should make to the system timing of the source cell (which may be an E-UTRA or non-E-UTRA cell) in order to obtain sufficient information about the target cell's system timing such that the UE can infer the E-UTRA system frame polarity (odd or even) of the E-UTRA target cell. This procedure may allow the UE to determine sufficient information about the target cell's SFN in order that a random access procedure can be initiated even if PRACH resources are not provisioned by the target cell within every radio frame.

The system timing adjustment may be signaled using time units based either on seconds (e.g., ms) or on the source cell's frame length (e.g., half-frames or quarter-frames). The timing unit selected for use could depend on the desired accuracy of relative timing synchronization between the two cells after the system timing adjustment has been applied. Note that a timing adjustment granularity of T may imply that a relative timing synchronization within T/2 can be achieved. For example, if the system timing adjustment is signaled in units of 1 ms, then a relative timing synchronization of ±0.5 ms may be achievable. As another example, if the system timing adjustment is signaled in units of quarter-frames (e.g., 2.5 ms for UTRAN and E-UTRAN), then a relative timing synchronization of ⅛ of a frame (i.e., 1.25 ms) may be achievable.

The number of bits required or desired for signaling the system timing adjustment may depend on the selected signaling granularity and the source RAT. This number of bits may be calculated as $\log_2(P/T)$, where P is the period (in ms) before an odd (or even) source cell frame pattern repeats, and T is the selected signaling granularity measured in ms. (If the signaling granularity is in units of frame fractions, then convert to ms first before applying this formula.)

For UTRAN and E-UTRAN, P may be 20 ms based on the occurrence of an odd and even frame pair. For CDMA2000, P may be 20 ms based on the total length of each CDMA2000 frame. For GERAN, P may be 120 ms based on the length of a 26-multiframe.

As an example, the selected system timing adjustment signaling granularity might be T=2.5 ms, which represents a quarter-frame (for E-UTRA and UTRA). Timing adjustments would therefore be signaled in units of quarter-frames (which have a time length of 2.5 ms). This signaling allows the compensated timing between the source and target cells to be synchronized within ±1.25 ms. This signaling may require three signaling bits covering a range of 0 to 7 for handover from E-UTRAN, UTRAN, and CDMA2000. This signaling may require six signaling bits covering a range of 0 to 47 (units of T=2.5 ms) or 0 to 51 (units of half TDMA frames, T≈2.3 ms) for handover from GERAN.

When the UE receives a signaled system timing adjustment in a handover command, the UE may calculate the target cell's relative system time (for the purpose of determining of frame polarity in the target cell) as: (Target cell relative system time)=(Source cell system time)+(A×T), where A is the signaled timing adjustment and T is the signaling granularity of the timing adjustment. Frame polarity alignment between the source and target cells may be defined here as the start of a source cell even (or odd) frame being less than 5 ms (less than half an E-UTRA radio frame) away from the start of a known even (or odd) target cell frame, as observed at the UE.

The following is an example of adding the time offset in the IE MobilityControlInfo, which is transmitted within RRC-ConnectionReconfiguration during the handover procedure. In this example, timing adjustments are signaled in units of quarter-frames for E-UTRA and UTRA (a quarter-frame has a time length of 2.5 ms) and in units of half-TDMA-frames for GERAN (a half-TDMA-frame has a time length of ~2.3 ms). The following exemplary IE is not meant to be limiting, and other granularity units for these timing adjustments may be used. Changes are shown in italics and underlined.

```
-- ASN1START
MobilityControlInfo ::=        SEQUENCE {
    targetPhysCellId            PhysCellId,
    carrierFreq                 CarrierFreqEUTRA            OPTIONAL, -- Cond
HO-toEUTRA
    carrierBandwidth            CarrierBandwidthEUTRA       OPTIONAL, -- Cond HO-
toEUTRA
    additionalSpectrumEmission  AdditionalSpectrumEmission  OPTIONAL, -- Cond
HO-toEUTRA
    t304                        ENUMERATED {
                                    ms50, ms100, ms150, ms200, ms500, ms1000,
                                    ms2000, spare1},
    newUE-Identity              C-RNTI,
    radioResourceConfigCommon   RadioResourceConfigCommon,
    rach-ConfigDedicated        RACH-ConfigDedicated        OPTIONAL, -- Need
OP
    ...,
    timingOffset                CHOICE {
        geranOffset             INTEGER(0..51),
        utranOffset             INTEGER(0..7),
        cdma2000Offset          INTEGER(0..7)
    }                           OPTIONAL                    -- Cond SyncHo
}
CarrierBandwidthEUTRA ::=       SEQUENCE {
    dl-Bandwidth                ENUMERATED {
                                    n6, n15, n25, n50, n75, n100, spare10,
                                    spare9, spare8, spare7, spare6, spare5,
                                    spare4, spare3, spare2, spare1},
    ul-Bandwidth                ENUMERATED {
                                    n6, n15, n25, n50, n75, n100, spare10,
                                    spare9, spare8, spare7, spare6, spare5,
                                    spare4, spare3, spare2, spare1}  OPTIONAL --
Need OP
}
CarrierFreqEUTRA ::=            SEQUENCE {
    dl-CarrierFreq              ARFCN-ValueEUTRA,
    ul-CarrierFreq              ARFCN-ValueEUTRA            OPTIONAL -- Cond
FDD
}
-- ASN1STOP
```

Table 4 below shows exemplary MobilityControlInfo field descriptions for an IE according to an embodiment of the present disclosure. Table 4 is for the IE described above, with changes in the table shown in italics and underlined.

TABLE 4

MobilityControlInfo field descriptions

*t304*
Timer T304 as described in section 7.3. ms50 corresponds with 50 ms, ms100 corresponds with 100 ms and so on.
*dl-Bandwidth*
Parameter: *Downlink bandwidth*, see TS 36.101 [42].
*ul-Bandwidth*
Parameter: *Uplink bandwidth*, see TS 36.101 [42, table 5.6-1]. For TDD, the parameter is absent and it is equal to downlink bandwidth. If absent for FDD, apply the same value as applies for the downlink bandwidth.
*rach-ConfigDedicated*
The dedicated random access parameters. If absent the UE applies contention based random access as specified in TS 36.321 [6].
*carrierBandwidth*
Provides the parameters *Downlink bandwidth*, and *Uplink bandwidth*, see TS 36.101 [42].
*timingOffset*
*This field is used to calculate the timing offset between the source and target cells. For UTRA and EUTRA, the time offset is in units of quarter radio frame, i.e., 2.5 ms. For GERAN, the time offset is in units of half-TDMA frame of GERAN.*

TABLE 4-continued

MobilityControlInfo field descriptions

| Conditional presence | Explanation |
| --- | --- |
| FDD | The field is mandatory with default value (the default duplex distance defined for the concerned band, as specified in TS 36.101 [42]) in case of "FDD"; otherwise the field is not present. |
| HO-toEUTRA | The field is mandatory present in case of inter-RAT handover to E-UTRA; otherwise the field is optionally present, need ON. |
| SyncHo | *The field is present for synchronised inter-RAT handover to E-UTRA; otherwise it is not present.* |

The embodiments described herein provide a number of benefits over the technical standards mentioned herein. In particular, the embodiments described herein reduce the handover to E-UTRA latency and reduce the handover to E-UTRA interruption time. Additionally, the embodiments provide a mechanism for determining the relative timing offset, or frame polarity, for determining PRACH resource locations in the target cell during a handover procedure.

Figure 7:
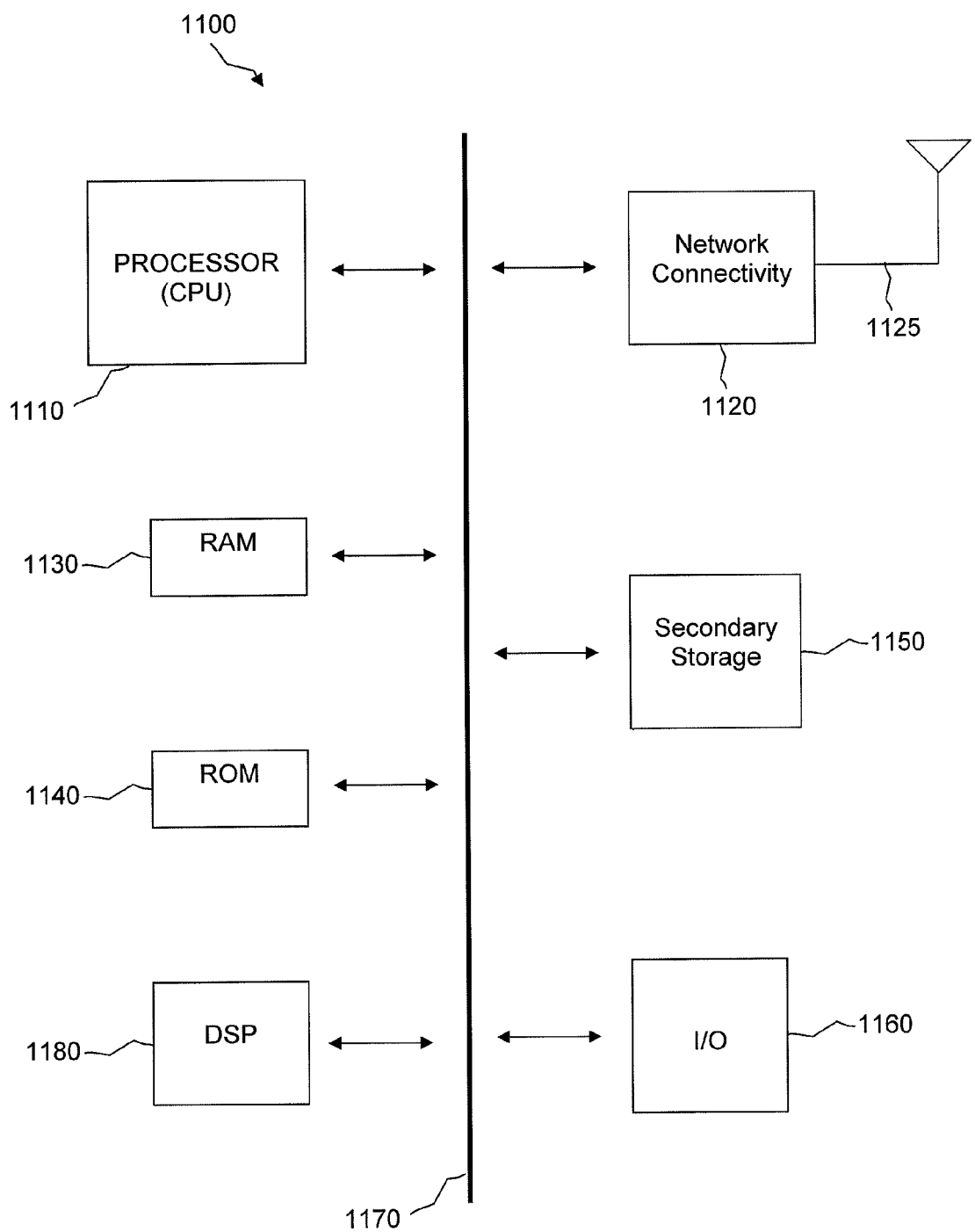
FIG. 7 illustrates a processor and related components suitable for implementing the several embodiments of the present disclosure.

The UE and other components described above might include processing and other components that alone or in combination are capable of executing instructions or otherwise able to promote the occurrence of the actions described above. FIG. 7 illustrates an example of a system 1100 that includes a processing component, such as processor 1110, suitable for implementing one or more embodiments disclosed herein. Accordingly, system 1100 may be employed to execute one or more of the previously-described embodiments. In addition to the processor 1110 (which may be referred to as a central processor unit or CPU), the system 1100 might include network connectivity devices 1120, random access memory (RAM) 1130, read only memory (ROM) 1140, secondary storage 1150, and input/output (I/O) devices 1160. These components might communicate with one another via a bus 1170. In some cases, some of these components may not be present or may be combined in various combinations with one another or with other components not shown. These components might be located in a single physical entity or in more than one physical entity. Any actions described herein as being taken by the processor 1110 might be taken by the processor 1110 alone or by the processor 1110 in conjunction with one or more components shown or not shown in the drawing, such as a digital signal processor (DSP) 1180. Although the DSP 1180 is shown as a separate component, the DSP 1180 might be incorporated into the processor 1110.

The processor 1110 executes instructions, codes, computer programs, or scripts that it might access from the network connectivity devices 1120, RAM 1130, ROM 1140, or secondary storage 1150 (which might include various disk-based systems such as hard disk, floppy disk, or optical disk). While only one CPU 1110 is shown, multiple processors may be present. Thus, while instructions may be discussed as being executed by a processor, the instructions may be executed simultaneously, serially, or otherwise by one or multiple processors. The processor 1110 may be implemented as one or more CPU chips.

The network connectivity devices 1120 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 1120 may enable the processor 1110 to communicate with the Internet or one or more telecommunications networks or other networks from which the processor 1110 might receive information or to which the processor 1110 might output information. The network connectivity devices 1120 might also include one or more transceiver components 1125 capable of transmitting and/or receiving data wirelessly.

The RAM 1130 might be used to store volatile data and perhaps to store instructions that are executed by the processor 1110. The ROM 1140 is a non-volatile memory device that typically has a smaller memory capacity than the memory capacity of the secondary storage 1150. ROM 1140 might be used to store instructions and perhaps data that are read during execution of the instructions. Access to both RAM 1130 and ROM 1140 is typically faster than to secondary storage 1150. The secondary storage 1150 is typically comprised of one or more disk drives or tape drives and might be used for non-volatile storage of data or as an over-flow data storage device if RAM 1130 is not large enough to hold all working data. Secondary storage 1150 may be used to store programs that are loaded into RAM 1130 when such programs are selected for execution.

The I/O devices 1160 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1125 might be considered to be a component of the I/O devices 1160 instead of or in addition to being a component of the network connectivity devices 1120.

In an embodiment, a UE is provided. The UE includes a processor configured such that the UE receives one or more wireless signals providing handover synchronization information of a first network component relative to one or more second network components. The first network component and the one or more second network components are in different radio access networks.

In another embodiment, a first network component is provided. The first network component includes a processor configured to transmit one or more signals providing handover synchronization information of the first network component relative to one or more second network components. The first network component and the one or more second network components are in different radio access networks.

In another embodiment, a method in a UE is provided. The method includes receiving one or more signals providing handover synchronization information of a first network component relative to one or more second network components. The first network component and the one or more second network components are in different radio access networks.

In another embodiment, a method in a first network component is provided. The method includes transmitting one or more signals providing handover synchronization information of the first network component relative to one or more second network components. The first network component and the one or more second network components are in different radio access networks.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented. While the claims below are identified as having certain dependencies and relationships, it should be appreciated that it is contemplated and should be understood that any of the claims may depend from any other claims or combinations of claims.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:
1. A user equipment (UE) comprising:
 a processor;
 a receiver configured to receive a message from a non-Evolved Universal Terrestrial Radio Access (E-UTRA) access device, the message providing handover synchronization information of the non-E-UTRA access device related to one or more E-UTRA access devices, the handover synchronization information comprising:
when the message is a handover message, an indicator indicating whether the non-E-UTRA access device is synchronized with a target E-UTRA access device, and
when the message is a broadcast message, an indicator indicating a synchronization state, wherein the synchronization state is a synchronized state or an unsynchronized state, and a list of the one or more E-UTRA access devices having the synchronization state indicated by the indicator; and
a controller configured to:
determine whether the non-EUTRA access device and the target E-UTRA access device are synchronized based on the handover synchronization information;
when the non-E-UTRA access device and the target E-UTRA access device are synchronized,
determine a polarity of a target E-UTRA system frame number based on a timing offset between the non-E-UTRA access device and the target E-UTRA access device; and
performing a random access procedure for an inter-radio access technology (RAT) handover from the non-E-UTRA access device to the target E-UTRA access device based on the received message.

2. The UE of claim 1, wherein a synchronization relationship is determined based on at least one of:
a list of all synchronized neighbors that could be signaled, with unlisted neighbors assumed to be unsynchronized;
a list of all unsynchronized neighbors that could be signaled, with unlisted neighbors assumed to be synchronized;
a list of synchronization states of other present radio access technologies;
a list of synchronization state per frequency;
a list of synchronization state per frequency per radio access technology;
a list of ranges of cell identities that are synchronized with other neighboring cells assumed to be unsynchronized; or
a list of ranges of cell identities that are unsynchronized, with other neighbor cells assumed to be synchronized.

3. The UE of claim 1, wherein the broadcast message includes one or more ranges of the one or more E-UTRA access devices.

4. The UE of claim 3, wherein the synchronization state of the non-E-UTRA access device related to the one or more E-UTRA access devices is determined by a presence or absence of the one or more E-UTRA access devices within the one or more ranges.

5. The UE of claim 3, wherein the one or more E-UTRA access devices being within the one or more ranges indicates that the one or more E-UTRA access devices are synchronized with the non-E-UTRA access device.

6. The UE of claim 3, wherein the one or more E-UTRA access devices not being within the one or more ranges indicates that the one or more E-UTRA access devices are not synchronized with the non-E-UTRA access device.

7. The UE of claim 1, wherein the one or more E-UTRA access devices operate as part of an E-UTRA network.

8. A non-Evolved Universal Terrestrial Radio Access (E-UTRA) access device comprising:
a processor;
a transmitter configured to transmit a message to a user equipment (UE) providing handover synchronization information of the non-E-UTRA access device related to one or more E-UTRA access devices, the handover synchronization information comprising:
when the message is a handover message, an indicator indicating whether the non-E-UTRA access device is synchronized with a target E-UTRA access device, and
when the message is a broadcast message, an indicator indicating a synchronization state, wherein the synchronization state is a synchronized state or an unsynchronized state, and a list of the one or more E-UTRA access devices having the synchronization state indicated by the indicator; and
a controller configured to:
determine whether the non-EUTRA access device and the target E-UTRA access device are synchronized based on the handover synchronization information;
when the non-E-UTRA access device and the target E-UTRA access device are synchronized,
determine a polarity of a target E-UTRA system frame number based on at least one of a system timing or a frame number in a source cell associated with the non-E-UTRA access device; and
performing an inter-radio access technology (RAT) handover to one of the one or more E-UTRA access devices initiated by the UE based on the transmitted message.

9. The non-E-UTRA access device of claim 8, wherein a synchronization relationship is determined based on at least one of:
a list of all synchronized neighbors that could be signaled, with unlisted neighbors assumed to be unsynchronized;
a list of all unsynchronized neighbors that could be signaled, with unlisted neighbors assumed to be synchronized;
a list of synchronization states of other present radio access technologies;
a list of synchronization state per frequency;
a list of synchronization state per frequency per radio access technology;
a list of ranges of cell identities that are synchronized with other neighboring cells assumed to be unsynchronized; or
a list of ranges of cell identities that are unsynchronized, with other neighbor cells assumed to be synchronized.

10. The non-E-UTRA access device of claim 8, wherein the broadcast message includes one or more ranges of the one or more E-UTRA access devices.

11. The non-E-UTRA access device of claim 10, wherein the synchronization state of the non-E-UTRA access device related to the one or more E-UTRA access devices is determined by a presence or absence of the one or more E-UTRA access devices within the one or more ranges.

12. The non-E-UTRA access device of claim 10, wherein the one or more E-UTRA access devices being within the one or more ranges indicates that the one or more E-UTRA access devices are synchronized with the non-E-UTRA access device.

13. The non-E-UTRA access device of claim 10, wherein the one or more E-UTRA access devices not being within the one or more ranges indicates that the one or more E-UTRA access devices are not synchronized with the non-E-UTRA access device.

14. The non-E-UTRA access device of claim 8 wherein the one or more E-UTRA access devices operate as part of an E-UTRA network.

15. A method in a user equipment (UE) comprising:
receiving a message from a non-Evolved Universal Terrestrial Radio Access (E-UTRA) access device, the message providing handover synchronization information of a non-E-UTRA access device related to one or more E-UTRA access devices, the handover synchronization information comprising:
when the message is a handover message, an indicator indicating whether the non-E-UTRA access device is synchronized with a target E-UTRA access device, and
when the message is a broadcast message, an indicator indicating a synchronization state, wherein the synchronization state is a synchronized state or an unsynchronized state, and a list of the one or more E-UTRA access devices having the synchronization state indicated by the indicator; and
determining whether the non-EUTRA access device and the target E-UTRA access device are synchronized based on the handover synchronization information;
when the non-E-UTRA access device and the target E-UTRA access device are synchronized,
determining a polarity of a target E-UTRA system frame number based on a timing offset between the non-E-UTRA access device and the target E-UTRA access device; and
performing a random access procedure for an inter-radio access technology (RAT) handover from the non-E-UTRA access device to one of the one or more E-UTRA access devices based on the received message.

16. The method of claim 15, wherein a synchronization relationship is determined based on at least one of:
a list of all synchronized neighbors that could be signaled, with unlisted neighbors assumed to be unsynchronized;
a list of all unsynchronized neighbors that could be signaled, with unlisted neighbors assumed to be synchronized;
a list of synchronization states of other present radio access technologies;
a list of synchronization state per frequency;
a list of synchronization state per frequency per radio access technology;
a list of ranges of cell identities that are synchronized with other neighboring cells assumed to be unsynchronized; or
a list of ranges of cell identities that are unsynchronized, with other neighbor cells assumed to be synchronized.

17. The method of claim 15, wherein the broadcast message includes one or more ranges of the one or more E-UTRA access devices.

18. The method of claim 17, wherein the synchronization state of the non-E-UTRA access device related to the one or more E-UTRA access devices is determined by a presence or absence of the one or more E-UTRA access devices within the one or more ranges.

19. The method of claim 17, wherein the one or more E-UTRA access devices being within the one or more ranges indicates that the one or more E-UTRA access devices are synchronized with the non-E-UTRA access device.

20. The method of claim 17, wherein the one or more E-UTRA access devices not being within the one or more ranges indicates that the one or more E-UTRA access devices are not synchronized with the non-E-UTRA access device.

21. The method of claim 15, wherein the one or more E-UTRA access devices operate as part of an E-UTRA network.

22. A method of a non-Evolved Universal Terrestrial Radio Access (E-UTRA) access device comprising:
transmitting a message to a user equipment (UE) providing handover synchronization information of the non-E-UTRA access device related to one or more E-UTRA access devices, the handover synchronization information comprising:
when the message is a handover message, an indicator indicating whether the non-E-UTRA access device is synchronized with a target E-UTRA access device, and
when the message is a broadcast message, an indicator indicating a synchronization state, wherein the synchronization state is a synchronized state or an unsynchronized state, and a list of the one or more E-UTRA access devices having the synchronization state indicated by the indicator; and
determining whether the non-EUTRA access device and the target E-UTRA access device are synchronized based on the handover synchronization information;
when the non-E-UTRA access device and the target E-UTRA access device are synchronized,
determining a polarity of a target E-UTRA system frame number based on at least one of a system timing or a frame number in a source cell associated with the non-E-UTRA access device; and
performing an inter-radio access technology (RAT) handover to one of the one or more E-UTRA access devices initiated by the UE based on the transmitted message.

23. The method of claim 22, wherein a synchronization relationship is determined based on at least one of:
a list of all synchronized neighbors that could be signaled, with unlisted neighbors assumed to be unsynchronized;
a list of all unsynchronized neighbors that could be signaled, with unlisted neighbors assumed to be synchronized;
a list of synchronization states of other present radio access technologies;
a list of synchronization state per frequency;
a list of synchronization state per frequency per radio access technology;
a list of ranges of cell identities that are synchronized with other neighboring cells assumed to be unsynchronized; or
a list of ranges of cell identities that are unsynchronized, with other neighbor cells assumed to be synchronized.

24. The method of claim 22, wherein the broadcast message includes one or more ranges of the one or more E-UTRA access devices.

25. The method of claim 24, wherein the synchronization state of the non-E-UTRA access device related to the one or more E-UTRA access devices is determined by a presence or absence of the one or more E-UTRA access devices within the one or more ranges.

26. The method of claim 24, wherein the one or more E-UTRA access devices being within the one or more ranges indicates that the one or more E-UTRA access devices are synchronized with the non-E-UTRA access device.

27. The method of claim 24, wherein the one or more E-UTRA access devices not being within the one or more ranges indicates that the one or more E-UTRA access devices are not synchronized with the non-E-UTRA access device.

28. The method of claim 22, wherein the one or more E-UTRA access devices operate as part of an E-UTRA network.

29. The UE of claim 1, wherein the handover message includes parameters used to calculate the timing offset between the non-E-UTRA access device and the E-UTRA access device.

30. The UE of claim 8, wherein the handover message includes parameters used to calculate the timing offset between the non-E-UTRA access device and the E-UTRA access device.

31. The UE of claim 15, wherein the handover message includes parameters used to calculate a timing offset between the non-E-UTRA access device and the E-UTRA access device.

32. The UE of claim 22, wherein the handover message includes parameters used to calculate a timing offset between the non-E-UTRA access device and the E-UTRA access device.

* * * * *